May 25, 1937.   C. W. SINCLAIR   2,081,605
BRAKE DRUM
Filed April 8, 1935
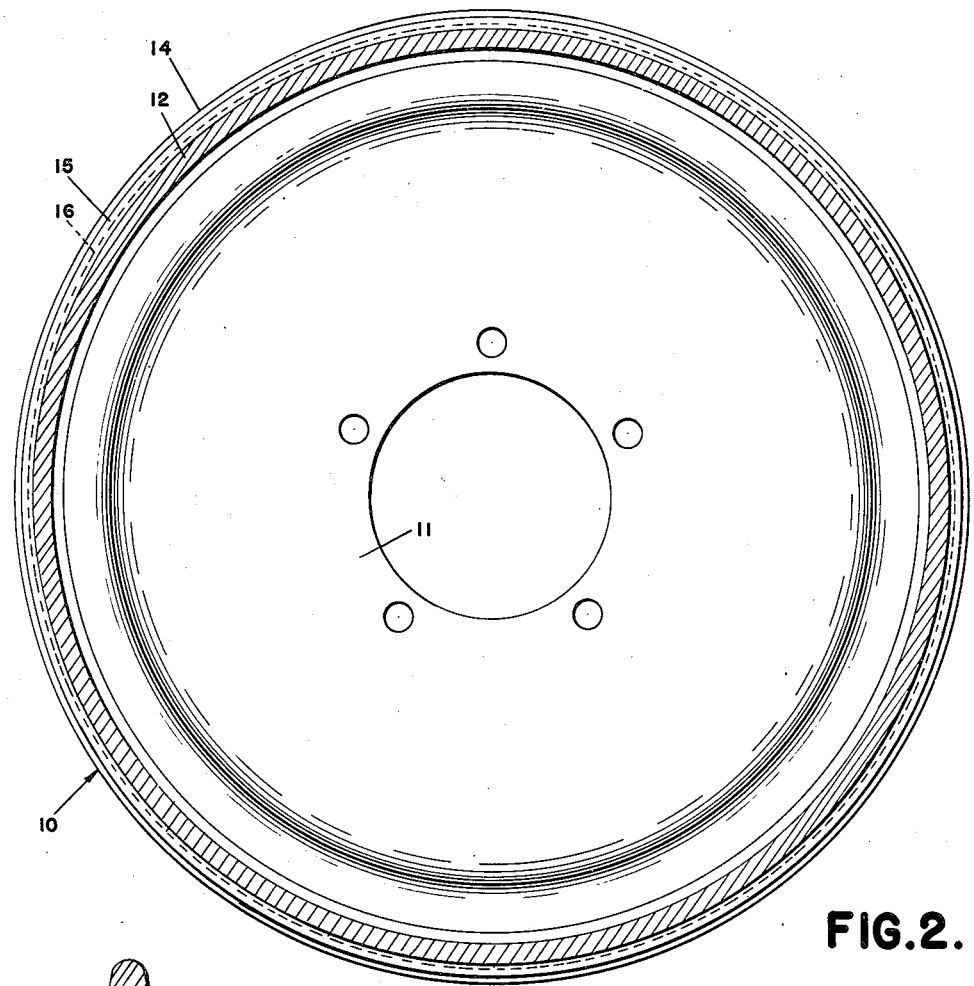
FIG.2.
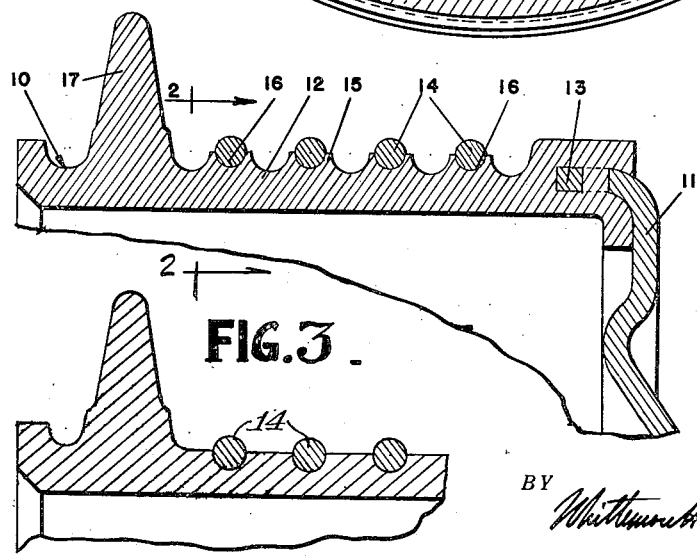
FIG.1.
FIG.3.
INVENTOR
CHARLES W. SINCLAIR
BY
ATTORNEYS Patented May 25, 1937

2,081,605

UNITED STATES PATENT OFFICE 2,081,605

BRAKE DRUM

Charles W. Sinclair, Detroit, Mich., assignor to Kelsey-Hayes Wheel Company, Detroit, Mich., a corporation of Delaware Application April 8, 1935, Serial No. 15,338

3 Claims. (Cl. 188—218)

This invention relates generally to brake drums and refers more particularly to brake drums of the type employed in association with internal expanding vehicle brakes.

One of the principal objects of this invention is to appreciably strengthen brake drums of the character set forth without materially increasing the weight or cost of manufacture thereof, by encircling the brake flange of the drum with a reinforcing strip, in such a manner that the reaction of the flange to the braking pressure is effectively counteracted by the strip and prevented from deforming the drum.

Another advantageous feature of this invention consists in the provision of a brake drum having a cast brake flange reinforced by a steel strip encircling the flange and embedded in a recess formed in the exterior surface of the flange.

A further object of the present invention consists in the provision of a brake drum having a plurality of axially spaced steel wire hoops and having an annular brake flange located within the hoops and cast integral therewith.

In addition to the foregoing, the present invention contemplates a brake drum having a cast brake flange provided with axially spaced annular reinforcing ribs and having a steel wire hoop in the periphery of each of the reinforcing ribs.

The foregoing, as well as other features of the present invention, will be made more apparent as this description proceeds, especially when considered in connection with the accompanying drawing, wherein:

Figure 1 is a cross sectional view through a brake drum constructed in accordance with this invention;

Figure 2 is a sectional view taken substantially on the plane indicated by the line 2—2 of Figure 1;

Figure 3 is a fragmentary sectional view through a slightly modified form of brake drum construction.

Referring now more in detail to the particular embodiment selected for the purpose of illustrating this invention, it will be noted from the drawing that the reference character 10 designates a brake drum of the composite type comprising a web or back 11 of sheet metal and an annular brake flange 12 cast on the back to provide an integral construction. Although any one of a number of methods may be employed to integrally connect the backing plate with the flange, nevertheless, for the purpose of illustration, I have shown the back as having an axially extending annular peripheral portion 13 embedded in one end of the flange 12 and having an interlocking connection therewith. In the present instance, the interlocking connection is effected by forming openings through the peripheral portion 13 of the back so as to permit the metal of the flange to flow through the openings during the casting operation and thereby integrally connect the flange to the back.

It has been previously stated that one of the principal objects of this invention is to effectively reinforce the brake drum, and this is accomplished herein by casting the brake flange 12 on a plurality of endless steel wire hoops 14. The hoops 14 are spaced from each other axially of the flange and encircle the latter. In the present instance, the exterior surface of the brake flange is formed with a plurality of annular reinforcing ribs 15 corresponding in number and spacing to the number and spacing of the reinforcing hoops, and each rib is formed with an annular groove 16 in the periphery thereof substantially semicircular in cross section for receiving one of the steel wire reinforcing hoops. In actual practice the hoops are positioned in the brake flange mold in proper spaced relationship prior to the casting operation with the result that upon completion of the casting operation the hoops are permanently secured in place or, in other words, form an integral part of the completed drum. In this connection, it should be understood that the reinforcing hoops are heated, during the casting operation, and the metal from which these hoops are formed is so selected that during the cooling operation the hoops will contract at a rate sufficiently faster than the rate of contraction of the flange 12 of the brake drum to insure an effective bond between the hoops and the flange 12. Of course, the number of steel wire reinforcing hoops may vary in dependence upon the rigidity required and, also, the ribs 15 may be eliminated entirely if desired. In this event the hoops are embedded in the cylindrical exterior surface of the flange in the manner shown in Figure 3. In either case, the continuous wire hoops cooperate to strengthen the flange to such an extent as to effectively counteract the internal brake pressures exerted upon the inner surface of the flange, and thereby prevent deforming of the drum by said pressures. It may be pointed out at this time, that the flange is further reinforced and the thermal characteristics appreciably increased by providing a rib 17 of substantial cross sectional area adjacent the free edge of the flange.

From the foregoing, it will be apparent to those skilled in this art, that the advantageous features previously discussed, may be realized, in whole or in part, by various alterations of the specific embodiment illustrated, and accordingly, reservation is made to make such changes in the construction as may come within the purview of the accompanying claims.

What I claim as my invention is:

1. A brake drum provided with a cast brake flange having an annular reinforcing rib extending outwardly from the exterior surface of the flange, and a reinforcing ring encircling the rib and embedded in the periphery of said rib with a portion extending outwardly from the periphery of the annular rib forming a lateral extension of the latter.

2. A brake drum provided with a cast brake flange having a plurality of annular reinforcing ribs spaced from each other axially of the flange and extending outwardly from the exterior surface of the flange, and a reinforcing ring encircling each rib and embedded in the latter with portions of the rings extending outwardly beyond the peripheries of the ribs to form extensions of the latter.

3. A brake drum provided with a cast brake flange having an annular outwardly extending reinforcing rib provided with an annular groove in the periphery thereof, and an endless reinforcing ring seated within the annular groove and forming a lateral extension of said rib.

CHARLES W. SINCLAIR.